(12) United States Patent
Tysinger

(10) Patent No.: US 7,579,492 B2
(45) Date of Patent: Aug. 25, 2009

(54) TWO-STAGE EXTRACTION OF SOYBEAN OIL

(75) Inventor: Jerry E Tysinger, Warsaw, NC (US)

(73) Assignee: Carolina Soy Products LLC, Warsaw, NC (US)

( * ) Notice: Subject to any disclaimer, the term of this patent is extended or adjusted under 35 U.S.C. 154(b) by 1060 days.

(21) Appl. No.: 10/677,015

(22) Filed: Sep. 30, 2003

(65) Prior Publication Data

US 2005/0069614 A1    Mar. 31, 2005

(51) Int. Cl.
C11B 1/00 (2006.01)
(52) U.S. Cl. .............................. 554/11; 554/9; 426/489
(58) Field of Classification Search ........................ None
See application file for complete search history.

(56) References Cited

U.S. PATENT DOCUMENTS 5,225,230 A * 7/1993 Seaman et al. .............. 426/634

6,511,690 B1 * 1/2003 Tysinger et al. ............. 426/489

FOREIGN PATENT DOCUMENTS

JP    56-078561    *    6/1981

OTHER PUBLICATIONS

Wingard, Journal of the American Oil Chemist Society, vol. 36, pp. 483-490, 1959.*
Muniyappa et al., Bioresource Technology, 56(1), pp. 19-24, 1996.*

* cited by examiner

Primary Examiner—Deborah D Carr
(74) Attorney, Agent, or Firm—MacCord Mason PLLC

(57) ABSTRACT

Soybean oil is extracted by a two-stage process in which up to 85%, preferably from about 60 to about 75%, of the soybean oil in soybeans is extracted by mechanical or solvent extraction to produce first extracted oil and oil-containing meal. The first extracted oil is then refined by caustic or physical refining. Substantially all of the oil remaining in the meal is extracted by solvent extraction to produce second extracted oil and substantially oil-free meal. The second extracted oil may be transesterified for use in biodiesel fuel.

10 Claims, 2 Drawing Sheets

TWO-STAGE EXTRACTION OF SOYBEAN OIL

BACKGROUND OF THE INVENTION (1) Field of the Invention

The present invention relates generally to a process for extracting and refining soybean oil, and in particular to the extraction of soybean oil using a two-stage extraction process, at least one of the stages being solvent extraction.

(2) Description of the Prior Art

Soybean oil production involves several steps that are necessary to render the soybean oil suitable for human consumption. These production steps may be broadly characterized as 1) soybean preparation, 2) oil extraction, and 3) oil refining. Soybean preparation generally includes the steps of cleaning, drying, cracking, and dehulling. The great majority of commercial soybean oil production processes extract or separate the oil from the soybean meal by a process known as solvent extraction. In the solvent extraction process, the beans are flaked during preparation to provide a large surface area. A solvent, commonly hexane, is then pumped through the soybean flakes to dissolve the oil in the hexane, separating approximately 99.5% of the oil from the meal. The hexane is then separated from the oil and recycled.

The crude oil resulting from the solvent extraction must then be subjected to one or more additional treatments, collectively called "refining", to remove various materials in order for the oil to be suitable for consumption. These materials include hydratable and non-hydratable phospholipids, free fatty acids, and various color and flavor components. Crude soybean oil contains phosphorous compounds called hydratable phospholipids, and small amounts of calcium and magnesium that complex with a portion of the phospholipids to form non-hydratable phospholipids. Hydratable phospholipids are normally removed by a process known as "degumming", in which the oil is agitated or otherwise intimately combined with water to precipitate gums from the oil. The gums are then removed by centrifugation.

These precipitated gums can be used as a feed additive, or evaporated to remove moisture. The end product, lecithin, has various end uses such as food emulsifier. The degummed oil is dried under vacuum to remove any water. Removal of non-hydratable phospholipids is considerably more difficult and expensive, requiring further chemical treatment, typically chemical refining, to break the chemical bonds between the calcium or magnesium ions and the phospholipids, followed with extensive bleaching of the oil.

In most processes, free fatty acids are removed from the oil by a process known as caustic refining, also called chemical or alkali refining, in which the oil is mixed with a caustic material, such as sodium or potassium hydroxide, which undergoes a saponification reaction with the acids, forming soaps that are then removed by centrifugation. Non-hydratable phospholipids are removed along with the free fatty acids. Chemical refining of soybean oil is an expensive process, requiring a large investment in capital equipment. In addition, a significant quantity of the oil is captured by the soaps, adversely affecting oil yield. Also, the caustic refining process produces soapstock, which has little commercial value, and it is difficult to dispose of without environmental problems.

Conventional refining processes also involve some bleaching of the soybean oil to remove color pigments that adversely affect the color of the oil. Finally, chemicals that add flavors to the oil are removed by a process known as "deodorization", which is essentially a form of distilling, in which the oil is subjected to high temperatures under a vacuum for a short period of time, which is sufficient to remove the flavor-causing components, but insufficient to break down non-hydratable phospholipids.

It is also known to extract soybean oil by mechanical extraction in which the soybeans are subjected to high temperatures and pressures. For example, the dehulled beans may be extruded through a screw extruder to frictionally heat the beans and rupture the oil cells. Within the screw extruder, the beans are subjected to high pressures and frictionally generated high temperatures for a short period. The crushed, oil-containing meal is then expeller or mechanically pressed to separate oil from the meal. About 25%, i.e., from about 15% to about 40%, of the total soybean oil is left in the meal by this process.

Commonly assigned U.S. Pat. No. 6,511,690 to Tysinger et al., issued Jan. 28, 2003, describes a process in which free fatty acids and other impurities may be removed from mechanically extracted soybean oil by physical refining. In physical refining, the oil is vacuum distilled at high temperatures, e.g., from about 450° F. to about 500° F., to separate more volatile components from the oil. This process is used to remove various flavor components, and will also remove free fatty acids. Physical refining is of limited to no value in refining solvent extracted soybean oil, due to the higher levels, i.e., more than 20 ppm based on elemental phosphorous content, of non-hydratable phospholipids. The high temperatures required for physical refining, as opposed to the temperatures of less than 500° F. possible with mechanical extraction, may tend to break down the non-hydratable phospholipids that are present in the solvent extracted soybean oil, producing chemical compounds that cause an unacceptable flavor and color.

In summary, the solvent extraction process is capable of extracting substantially all of the oil from soybeans, but is an expensive process using chemicals that must be recycled, and tends to result in oil having a relatively limited fry life. The above-described mechanical extraction process avoids many of the disadvantages of the solvent extraction process, but is capable of extracting only about 75% of the available soybean oil. Thus, there is a continuing need for a soybean oil extraction process that results in superior oil, while still permitting the extraction and utilization of substantially all of the available oil.

SUMMARY OF THE INVENTION

The present invention addresses this need with a two-step extraction process to produce a first extracted soybean oil, a second extracted soybean oil, and substantially oil-free soybean meal. The first and second extracted oils can be further treated to produce commercially valuable end products, while the soybean meal can be used in various products.

Generally, the process of the invention comprises subjecting prepared soybeans to mechanical or solvent extraction to remove up to about 85% of the soybean oil present in the soybeans, resulting in first extracted soybean oil and soybean meal containing the remainder of the soybean oil. The first extracted soybean oil is then further processed as will be described hereinafter. If solvent extraction is used, about 60-85% of the oil will be removed in the first extraction, while only up to about 75% of the oil will be removed by mechanical extraction under normal processing conditions. First extracted soybean oil, whether obtained by solvent extraction or mechanical extraction, when used as cooking oil exhibits a long fry life without the need for hydrogenation similar to the oils described in U.S. Pat. No. 6,511,690 and co-pending application Ser. No. 10/066,250.

Substantially all of the oil in the oil-containing meal is then extracted from the meal by solvent extraction, resulting in a second extracted oil and a substantially oil-free meal. The second extracted oil is then further processed as will be described hereinafter. The meal may be further processed or used, for example, in animal feed.

If the oil is to be initially extracted from the soybeans by solvent extraction, the soybeans are first flaked, i.e., thinly sliced or passed through rollers to form flakes of about 0.3 mm in thickness. The flakes are then contacted with a suitable solvent, e.g., by immersion or counter-current flow. The solvent normally used will be hexane, although it will be understood that other solvents recognized as useful in solvent extraction, such as ethyl alcohol or isopropyl alcohol, can be used. Following extraction, the solvent is recovered from the meal, e.g., by steam distillation, for subsequent reuse.

Unlike prior art solvent extraction processes in which the soybean flakes are contacted with sufficient solvent to extract substantially all of the oil, the present process contacts the soybeans with only an amount of solvent sufficient to remove up to about 85%, preferably about 60 to about 75% of the oil present in the soybeans. The amount of solvent used will vary depending on the solvent and the condition of the soybeans. Normally, however, the ratio of solvent to available soybean oil in the present process will be less than the 1:1 ratio conventionally used in solvent extraction, e.g., from about 0.25:1 to about 0.95:1.

Solvent extraction of oil from soybeans is per se well known in the art. Therefore, except for the fact that a lower percentage of oil is intentionally extracted, the steps used in the present invention for solvent extraction and subsequent solvent recovery will be known to one skilled in the art.

Instead of solvent extraction, the first extracted oil may be extracted from the soybeans by mechanical extraction. In mechanical extraction, the prepared soybeans are subjected to heat and pressure to press up to about 85%, normally from about 60% to about 75%, of the oil from the soybeans, resulting in first extracted soybean oil and oil-bearing meal. One way to simultaneously heat and crush the soybeans is to extrude the soybeans through an extruder in which the soybeans are subjected to high pressures that crush the beans while frictionally heating the soybeans. The crushed beans are then expeller or mechanically pressed to separate the soybean oil from the meal.

For example, as described in commonly assigned, co-pending U.S. patent application Ser. No. 10/066,250, filed Jan. 31, 2002, which is incorporated herein by reference, the soybeans may be rapidly heated to a temperature of from about 300° F. to about 370° F., preferably from about 315° F. to about 335° F., followed by mechanically pressing the oil from the soybeans. The time during which the soybeans are heated is also important. Preferably, the soybeans are heated to the desired temperature in less than about 60 seconds, and preferably from about 10 to about 30 seconds.

The first extracted soybean oil may be further treated to remove impurities, rendering the oil acceptable for such uses as cooking oil, salad dressings, etc. Phospholipids may be removed by degumming, which comprises intimately mixing the crude soybean oil with water, which may contain citric acid or a similar organic acid, to form gums of the hydratable phospholipids, and then removing the gums from the crude oil, e.g., by centrifuging. The degummed oil may then be bleached with bleaching materials, such as clay, silica gel, and if needed for damaged beans, sodium metasilicate or sodium hydroxide. The oil may then be vacuum dried and filtered.

The first extracted oil may be further processed to remove free fatty acids and components that contribute to the color and flavor of the oil. Free fatty acids in solvent extracted soybean oil are normally removed by a process known as caustic refining in which an alkali, e.g., potassium or sodium hydroxide is intimately mixed with the oil to react with the free fatty acids, producing soap stock that is removed by centrifugation. The process of caustic refining is per se known to one skilled in the art. While caustic refining may be used in the present invention, the partial oil extraction resulting from the lower ratio of solvent to oil also enables the solvent extracted oil to be refined using physical refining normally associated only with oil obtained through mechanical extraction.

Removal of free fatty acids from solvent extracted soybean oil by physical refining is generally not feasible due to the large amount of non-hydratable phospholipids in the oil, which degraded under the high temperatures required for physical distillation. However, physical refining of soybean oil extracted mechanically under the above-noted conditions is possible, since the amount of non-hydratable phospholipids is generally less than 2.0 ppm based on the weight of elemental phosphorous in the compounds.

In physical refining, free fatty acids and flavor components are removed from the oil by heating the oil in a distillation column to a temperature of from about 450° F. to about 500° F., and preferably for from about 460° F. to about 480° F., to vacuum distill off the free fatty acids and flavor materials. By industry standards, the final oil should contain less than about 0.05% free fatty acids.

Oil-containing soybean meal is subjected to a second extraction stage using solvent extraction to remove substantially all of the remaining oil. In this second stage, the meal is intimately contacted with a solvent, preferably hexane, with the amount of solvent being sufficient to dissolve substantially all of the oil in the meal. This second extracted oil is then separated from the substantially oil-free meal.

Second extracted oil, due to the greater impurities present compared to those of the first extracted oil, cannot be refined effectively by the either of the procedures described above for refining first extracted oil. Instead, this oil in accordance with the present invention may be converted to other commercially valuable products, in particular esters for use alone or in combination with petroleum distillates as biodiesel fuel.

Soybean oil can be converted into biodiesel fuel, or a component thereof, by transesterification of the soybean oil with an alcohol, such as methanol, ethanol, isopropanol, isobutanol, or mixtures thereof to form alkyl esters, e.g., the methyl esters, ethyl esters, etc. The transesterification reaction normally occurs in the presence of a base catalyst, such as sodium alkoxide, or sodium or potassium hydroxide. An acid catalyst, such as sulfuric acid, hydrogen chloride or boron trifluoride, can also be used, particularly if a large amount of free fatty acids are present in the soybean oil. Following transesterification, the esters are separated from glycerol and soapstock.

The soybean oil esters may be used alone, but will normally be admixed with a petroleum distillate, such as kerosene. Preferably, the petroleum distillate has a molecular weight of from about 140 to about 300. Desirably, the soybean oil esters will comprise from about 20% to about 100% of the biodiesel fuel.

DETAILED DESCRIPTION OF THE INVENTION

Figure 1:
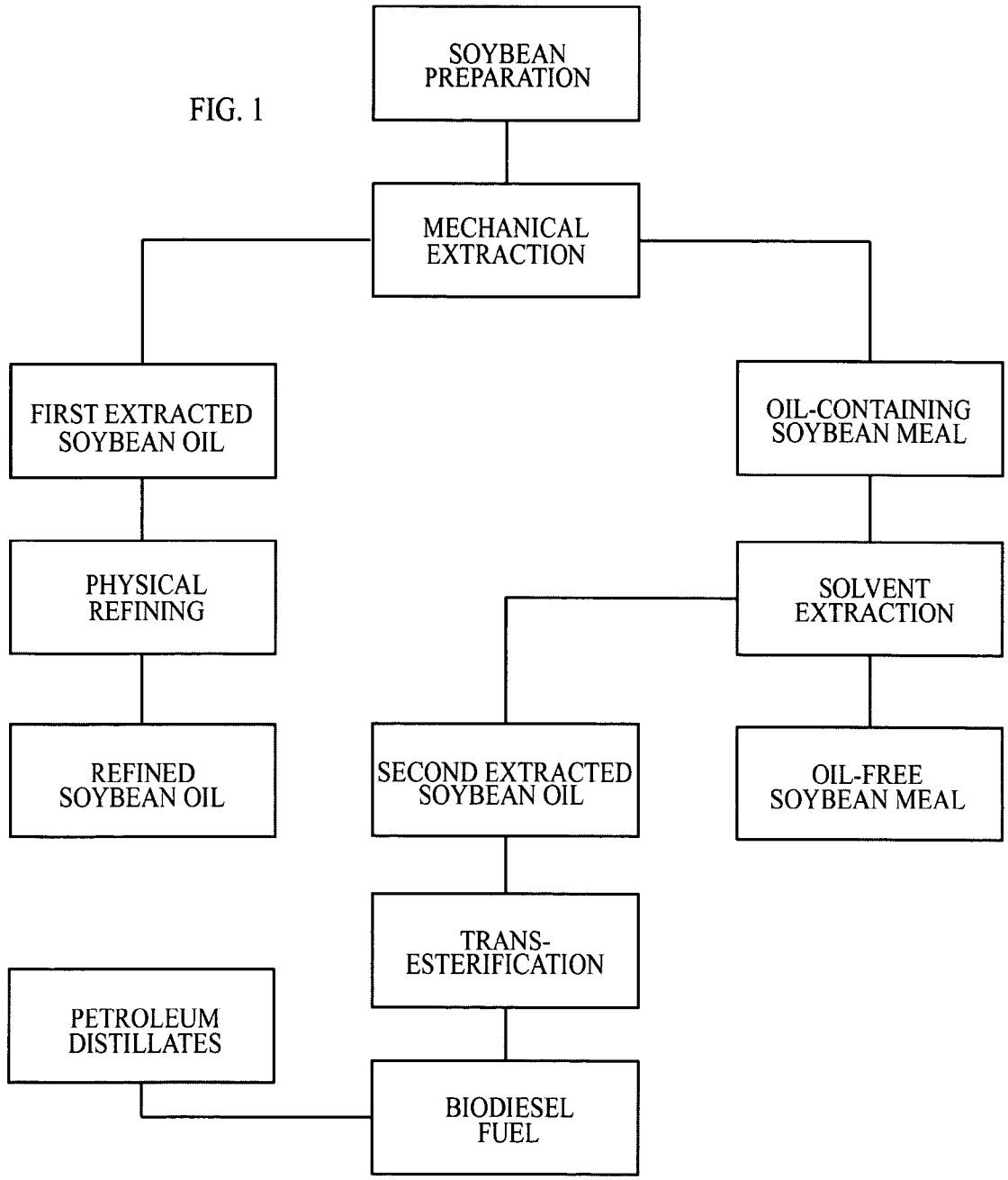
FIG. 1 is a schematic diagram of a first embodiment of the invention.

As illustrated in FIG. 1, in a first embodiment of the invention, soybeans are first prepared for extraction by cleaning, drying, cracking, and dehulling. Oil is then extracted from the soybeans by mechanical extraction. For example, the cleaned and dehulled soybeans may be extruded through an extruder to mechanically crush and frictionally heat the soybeans to a temperature of 300° F. to 370° F. Crushed soybeans exiting the extruder are then pressed to separate from about 60% to about 85% of the oil from the soybean meal. The separated oil is screened to remove remaining solids prior to the refining process.

The crude soybean oil is then degummed with water containing citric acid and centrifuged to remove gums of the hydratable phospholipids. The degummed oil was then bleached, vacuum dried and filtered. The soybean oil is then physically or caustic refined. For example, the oil may be heated in a deodorizer or distillation column to a temperature of from about 450° F. to about 500° F., to distill off the free fatty acids and flavor materials.

The soybean meal, which still includes from about 20% to about 40% of the oil originally in the soybeans, is then subjected to solvent extraction to remove substantially all of the oil. This second extracted oil is then transesterified to form soybean oil esters, which are separated from glycerol and then mixed with petroleum distillates, or used alone, use as biodiesel fuel.

Figure 2:
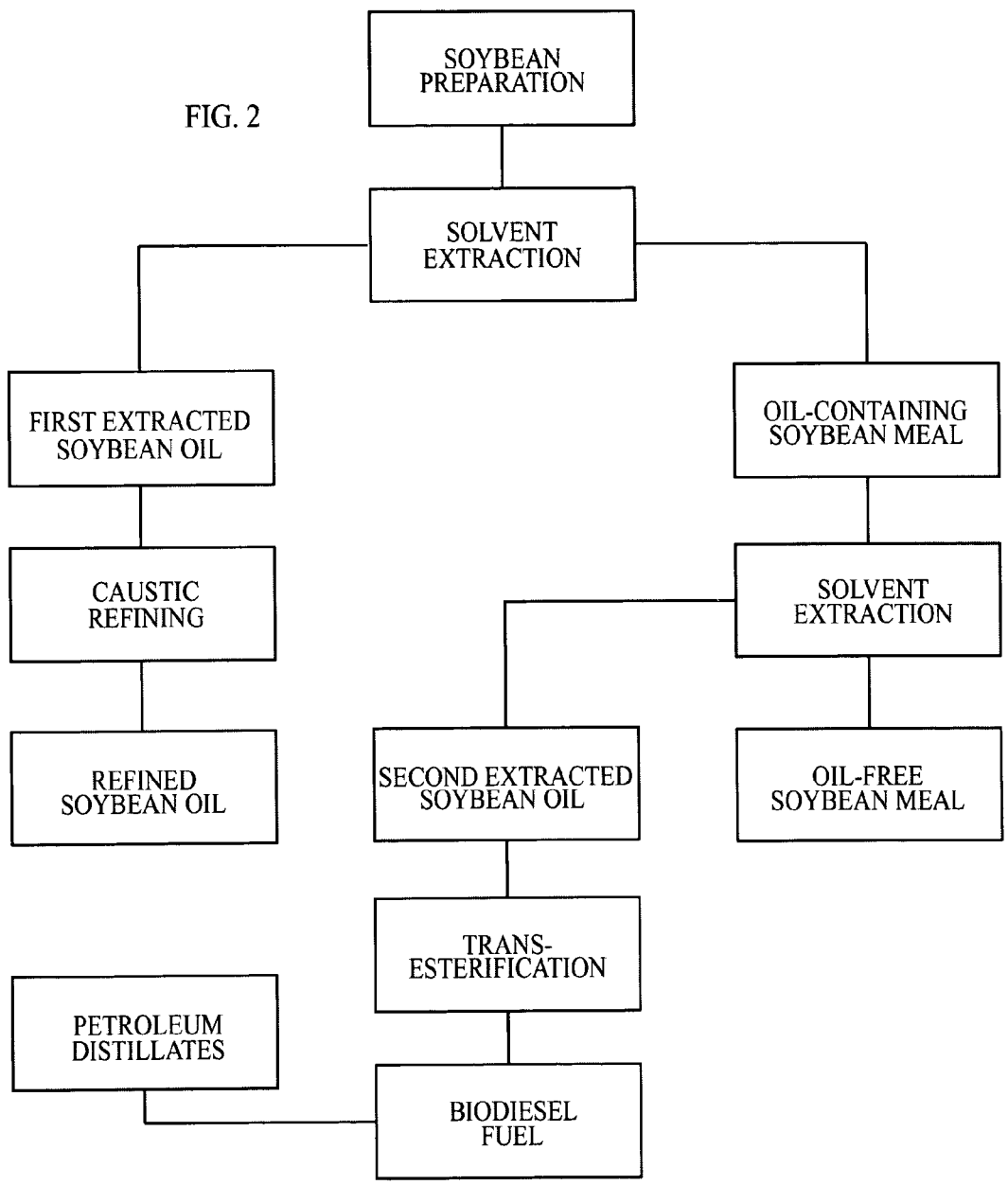
FIG. 2 is a schematic diagram of a second embodiment of the invention.

FIG. 2 illustrates a similar process, except that oil is extracted from the soybeans by solvent extraction, with the first extracted oil being refined by physical or caustic refining. In the solvent extraction step, the soybeans are flaked by a known procedure. The flakes are then mixed with a solvent, normally hexane, in a ratio of from about 1:0.5 to about 1:0.85 to extract up to about 85%, and preferably from about 60% to about 85% of the oil present in the soybeans. The hexane is then separated from the oil by steam distillation or other known procedures. Oil from the solvent extraction procedure is then refined by physical or caustic refining to remove impurities and components that impair the utility of the oil for use as a cooking oil, salad dressing, etc.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A process for producing soybean oil from soybeans comprising:
   a) extracting up to about 85% of the oil from the soybeans by solvent extraction to produce first extracted soybean oil and oil-containing meal;
   b) caustic refining said first extracted soybean oil; and
   c) extracting substantially all of the oil in said oil-containing meal by solvent extraction to produce second extracted soybean oil and substantially oil-free meal.

2. The process of claim 1, wherein oil is extracted from said soybeans by flaking said soybeans and contacting the soybean flakes with a solvent 3. The process of claim 1, wherein oil is extracted from said soybean meal with hexane.

4. The process of claim 1, wherein said oil extracted by contacting said soybeans with hexane in a ratio of hexane to available soybean oil of less than 1:1.

5. The process of claim 1, wherein from about 60 to about 85% of the oil in said soybeans is extracted.

6. The process of claim 1, wherein said second extracted soybean oil is transesterified to produce biodiesel.

7. A process for producing soybean oil from soybeans comprising:
   a) extracting up to about 85% of the oil from the soybeans by solvent extraction to produce first extracted soybean oil and oil-containing meal;
   b) caustic refining said first extracted soybean oil; and
   c) extracting substantially all of the oil in said oil-containing meal by solvent extraction to produce second extracted soybean oil and substantially oil-free meal.

8. A process for producing soybean oil from soybeans comprising:
   a) extracting up to about 85% of the oil from the soybeans to produce first extracted soybean oil and oil-containing meal;
   b) physically refining said first extracted soybean oil; and
   c) extracting substantially all of the oil in said oil-containing meal by solvent extraction to produce second extracted soybean oil and substantially oil-free meal.

9. A process for producing soybean oil from soybeans comprising:
   a) extracting up to about 85% of the oil from the soybeans by solvent extraction to produce first extracted soybean oil and oil-containing meal by contacting said soybeans with hexane in a ratio of hexane to available soybean oil of less than 1:1; and
   b) refining said first extracted soybean oil.

10. A process for producing soybean oil from soybeans comprising:
    a) extracting up to about 85% of the oil from the soybeans by solvent extraction to produce first extracted soybean oil and oil-containing meal;
    b) refining said first extracted soybean oil; and
    c) extracting substantially all of the oil in said oil-containing meal by solvent extraction to produce second extracted soybean oil and substantially oil-free meal and transesterifying said second extracted soybean oil.

* * * * *